(No Model.)
H. J. SHARP.
HARROW.
No. 358,700. Patented Mar. 1, 1887.
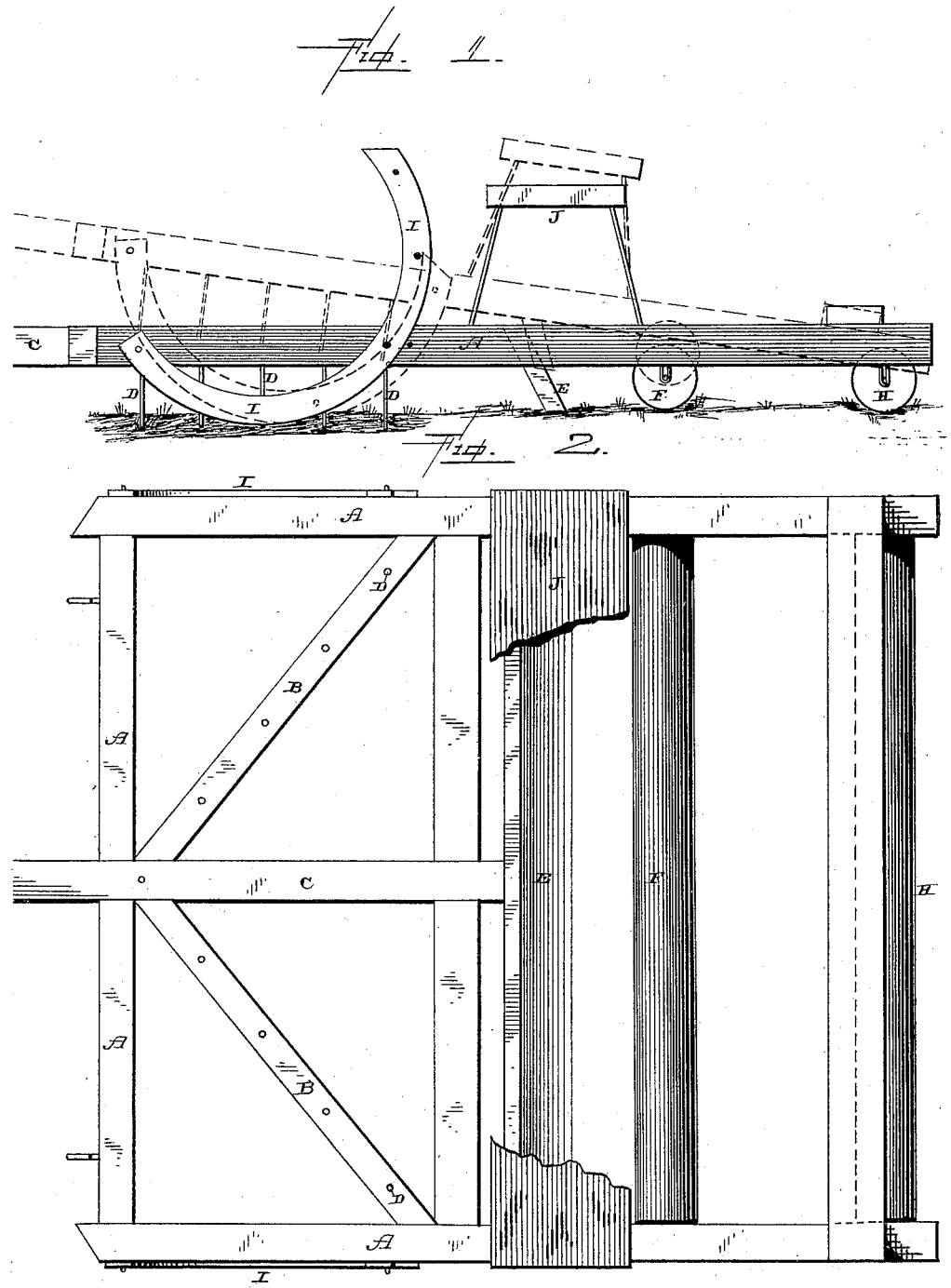

UNITED STATES PATENT OFFICE.

HARDY JOSEPHUS SHARP, OF LACEY, ARKANSAS.

HARROW.

SPECIFICATION forming part of Letters Patent No. 358,700, dated March 1, 1887.

Application filed December 15, 1886. Serial No. 221,660. (No model.)

*To all whom it may concern:*

Be it known that I, HARDY JOSEPHUS SHARP, of Lacey, in the county of Drew and State of Arkansas, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and it consists in the combination of the harrow with two adjustable runners which are pivoted to the opposite front corners of the frame, and which are made adjustable at each of their ends, so as to be raised and lowered at the will of the operator, and a roller which is journaled in the rear end of the frame, as will be more fully described hereinafter.

The object of my invention is to provide a harrow not only with means for regulating the depth at which the harrow shall run, but to use the same devices which regulate the depth as runners for transporting the harrow from place to place in connection with the rear roller, which is made to act as wheels for supporting the rear portion of the frame.

Figure 1 is a side elevation of a harrow to which my invention is applied, the parts being shown in dotted lines and in another position in solid lines. Fig. 2 is a plan view with the seat removed.

A represents a rectangular frame, which may either be of the construction here shown or any other that may be preferred. Projecting downward from the under side of the two bars B, which are to be placed at a suitable angle to the tongue C and the sides of the frame A, are the harrow-teeth D, which may be of any suitable shape, form, or construction which may be desired. Placed near the middle of the frame A is the inclined board E, which acts as a clod-crusher, and in the rear of this clod-crusher is placed the roller F, which serves to roll the ground after the clods have been broken, and thus reduce them still more.

Journaled in suitable bearings at the rear end of the frame is a second roller, H, which may be of large diameter and project farther below the bottom of the frame than the roller in front; but I do not limit myself to any details of construction in this respect. This rear roller serves the double purpose of assisting to roll the ground and as wheels to support the frame when the harrow is to be moved from one place to another. As long as the harrow is in a horizontal position this rear roller serves simply to roll the ground; but when the front end of the frame is raised upward it then becomes a wheel which supports the rear portion of the frame.

Pivoted to the front corners of the frame are the runners I, which are curved, as shown, and which have a series of holes made through their rear ends, so that they can be adjusted into different positions, according to the position in which the harrow is to be used. When the runners are fastened in position against the side of the frame so that their rear ends project up above the top edge of the frame, the runners serve only to regulate the depth at which the harrow-teeth shall run. When, however, the rear ends of the runners are depressed so as to throw the largest portion of the runners below the frame, the runners then serve to raise the front end of the frame above the ground, and act as supports for the front end, while the rear end is supported entirely upon the rear roller. In this position the harrow can be readily moved from one part of the field to another. By having devices to regulate the depth that the teeth shall run the work of drawing the harrow around the field is made much easier upon the team, and by making these devices for regulating the depth adjustable they are made to perform a double duty.

Mounted upon the top of the frame, just over the clod-crusher and the front roller, is the seat J, for the driver to sit upon. This seat is arranged at that point where the greatest weight is necessary for the purpose of reducing the clods.

Having thus described my invention, I claim—

The combination of the rectangular harrow-frame A, provided with the diagonal bars B and teeth D, the clod-crusher E, and the roller H at the rear end of the frame, with the curved adjustable runners I, which are fastened at their front ends to the opposite front corners of the frame A, and which are adjustable at their rear ends, and which runners serve both as a means of regulating the depth at which the harrow-teeth shall run and as runners for supporting the front end of the frame while the harrow is being moved from place to place, substantially as shown and described.

In testimony whereof I affix my signature in presence of witnesses.

HARDY JOSEPHUS SHARP.

Witnesses:
C. F. HUDEFUET,
S. J. MATTHEWS,
HARRY HAWKINS.